UNITED STATES PATENT OFFICE.

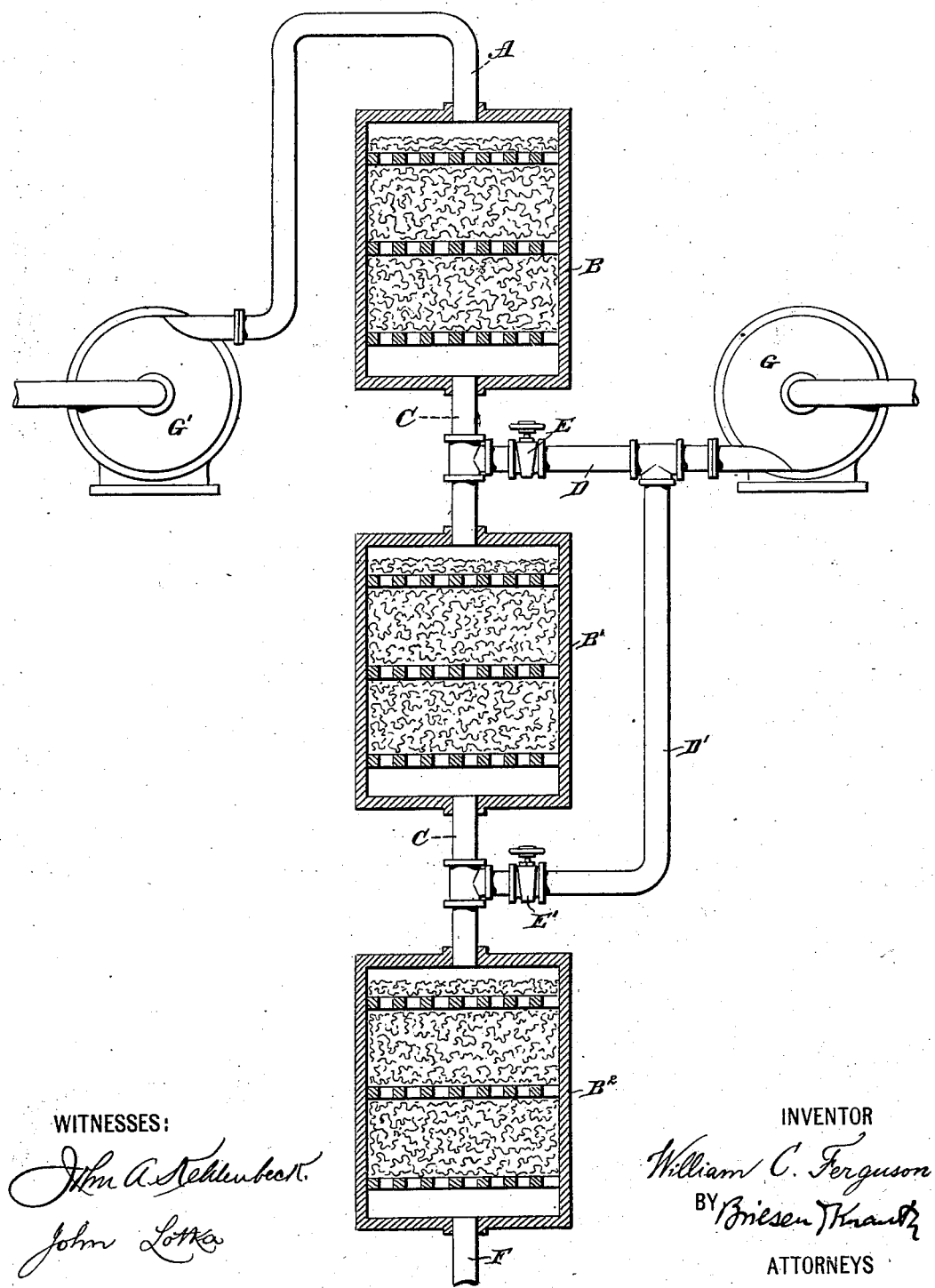

WILLIAM C. FERGUSON, OF FLUSHING, NEW YORK, ASSIGNOR TO GENERAL CHEMICAL COMPANY, OF NEW YORK, N. Y., A CORPORATION OF NEW YORK.

APPARATUS FOR MAKING SULFURIC ANHYDRID.

SPECIFICATION forming part of Letters Patent No. 723,595, dated March 24, 1903.

Application filed June 11, 1902. Serial No. 111,104. (No model.)

*To all whom it may concern:*

Be it known that I, WILLIAM C. FERGUSON, a citizen of the United States, residing at Flushing, county of Queens, State of New York, have invented certain new and useful Improvements in Apparatus for the Manufacture of Sulfuric Anhydrid, of which the following is specification.

My invention relates to apparatus for manufacturing sulfuric anhydrid, and has for its object to provide a reliable apparatus of this class which will be subject to little wear and which can be readily regulated so as to secure the highest efficiency.

A specific form of an apparatus embodying my invention is shown in side elevation in the accompanying drawing, and I desire it to be understood that I have shown this particular form as an example only and that the scope of my invention is indicated in the appended claims.

The apparatus comprises a series of contact-chambers, of which there are at least two, these chambers being connected with each other in a peculiar manner.

A indicates the inlet-tube for the burner-gas or other mixture containing sulfurous-acid gas ($SO_2$) and oxygen or air.

B is the first contact-chamber, which may be of any suitable construction so far as the interior arrangement of the catalytic substances is concerned. The contact-chambers $B'$ $B^2$ may be of the same structure as the first contact-chamber B. Adjacent contact-chambers are connected by pipes C $C'$, respectively, so that the product leaving one contact-chamber may pass directly to the inlet of the next. These connecting-pipes C $C'$ are provided with branches D $D'$, the connection of which with the pipes C $C'$ may be controlled by cocks or valves E $E'$. Any suitable device may be employed for feeding the air. For instance, a blower G and a blower $G'$ or any other suitable device may be employed for causing the gaseous mixture to pass through the series of contact-chambers. Finally the last contact-chamber of the series has an outlet-pipe which leads to suitable apparatus for absorbing or further treating the sulfuric anhydrid produced.

In operation a mixture containing sulfurous-acid gas and air or, generically speaking, free oxygen is admitted through the inlet A into the first contact-chamber B. This chamber is of such dimensions that only a portion of the sulfurous-acid gas will be converted in it into sulfuric anhydrid. I prefer to employ a mixture containing a rather high proportion of sulfurous-acid gas—for instance, eleven per cent. thereof or more. The partial conversion into sulfuric anhydrid of course absorbs some of the free oxygen, and the partially-converted product escaping through the connecting-pipe C is therefore relatively poor in free oxygen. This partially-converted product, further, is of a relatively high temperature, which renders it advisable to cool the product before it is again brought into contact with catalytic substances for continuing the conversion of sulfurous-acid gas into sulfuric anhydrid. For this double purpose of cooling the partially-converted product and of supplying to it any deficiency in oxygen I introduce into the partially-converted product while it is on its way from one contact-chamber to the next—that is, while it is away from the catalytic substances—a suitable amount of oxygen or of atmospheric air, the latter being preferable for practical reasons. I desire it to be understood, however, that oxygen might be used as the equivalent of air. This air may be simply atmospheric air of ordinary temperature, or when desired the air may be cooled artificially before it is admixed to the partially-converted product. The use of a pipe as a connection from the outlet of one contact-chamber to the inlet of the next is of great practical importance in my invention for the following three reasons: First, the partially-converted mixture is caused to assume the form of a comparatively narrow stream, so that practically every one of its particles comes in contact with the cool air introduced into the connecting-pipe. A better mixture is therefore obtained by the contact of practically every portion of the partially-converted mixture with the cooling medium. Second, the use of a pipe increases the velocity with which the particles of the unconverted mixture move, as well as those of the cooling medium, as compared with the rate at which the mixture moves within the contact-chamber. In consequence thereof there is a rapid motion and agitation of the two constituent portions of the mixture and they mingle more thoroughly. Third, by the use of the pipe the danger of having the cooling effect spread by conduction or transmission to the preceding contact-chamber, where it might detrimentally affect the reaction, is avoided altogether or at least minimized. The mixture which has thus been brought to a temperature suitable for the continuation of the contact process and which also contains a sufficient amount of free oxygen then passes into the second contact-chamber, where by the action of the catalytic substances a further portion of the sulfurous-acid gas is converted into sulfuric anhydrid. It depends largely upon the richness of the original mixture and upon the size of the contact-chambers whether the practically complete conversion into sulfuric anhydrid is obtained in two chambers or whether a greater number of chambers is required. I consider it preferable to employ at least three chambers, for the reason that in this case the temperature within each chamber remains relatively moderate and the deterioration of the apparatus by the heat is considerably reduced. In any event, however, it will be understood that the contact-chambers, even when only two of them are used, are subjected to a much lower temperature than that which would obtain if the entire process were conducted to a finality in a single contact-chamber. The use of a mixture rich in $SO_2$ has the advantage of reducing the volume of the original mixture brought into the first contact-chamber as compared with a poorer mixture containing the same amount of $SO_2$—that is, in my process the volume of the original gaseous mixture for the same output of anhydrid is reduced. This is of twofold advantage. First, there is less danger of the accidental formation of anhydrid before the beginning of the contact process, inasmuch as the supply of free oxygen is smaller, and, second, the purification of the mixture previous to the contact process is facilitated partly because the mixture contains less anhydrid (the presence of which renders the purification more difficult) and partly because of the reduced volume of the mixture. The cost of scrubbing is therefore materially decreased.

What I claim is—

1. An apparatus for the manufacture of sulfuric anhydrid, said apparatus comprising a plurality of contact-chambers, a connection-pipe from the outlet of one chamber to the inlet of the next, an air-supply pipe branched on such connection-pipe, and a regulating device on said air-supply pipe.

2. An apparatus for the manufacture of sulfuric anhydrid, said apparatus comprising a plurality of contact-chambers, a connection-pipe from the outlet of one chamber to the inlet of the next, and an air-supply device leading to said connection-pipe between said two contact-chambers and so that air will be admixed to the partially-converted product while the latter is away from the catalytic substances.

In testimony whereof I have signed my name to this specification in the presence of two subscribing witnesses.

WILLIAM C. FERGUSON.

Witnesses:
 JOHN LOTKA,
 EUGENE EBLE.